United States Patent [19]
Yoshida et al.

[11] Patent Number: 5,449,228
[45] Date of Patent: Sep. 12, 1995

[54] APPARATUS FOR LOCKING AN OPERATING UNIT TO A VEHICLE-MOUNTED ELECTRONIC EQUIPMENT

[75] Inventors: Tomoji Yoshida; Masakazu Hasegawa; Takeshi Baba, all of Toda, Japan

[73] Assignee: Clarion Co., Ltd., Tokyo, Japan

[21] Appl. No.: 994,107

[22] Filed: Dec. 21, 1992

[30] Foreign Application Priority Data

Dec. 27, 1991 [JP] Japan .............................. 3-107947 U
Aug. 26, 1992 [JP] Japan .............................. 4-060122 U

[51] Int. Cl.⁶ .................................................. H05K 11/02
[52] U.S. Cl. ........................................ 312/215; 455/346
[58] Field of Search ..................... 455/346, 348, 349; 312/215, 222

[56] References Cited

U.S. PATENT DOCUMENTS 4,940,414 7/1990 Lee ........................................ 455/349
5,245,511 9/1993 Watanabe ............................ 455/346

FOREIGN PATENT DOCUMENTS 3151693 6/1991 Japan .
3205679 9/1991 Japan .
3238645 10/1991 Japan .

*Primary Examiner*—Kenneth J. Dorner
*Assistant Examiner*—Gerald A. Anderson
*Attorney, Agent, or Firm*—Price, Gess & Ubell

[57] ABSTRACT

When an operating unit (10) of a vehicle-mounted electronic equipment is attached to its equipment body (20), a first engaging portion (18) and a second engaging portion (24) of engaging means are engaged and the operating unit is turned around the engaging means in a direction in which the operating unit contacts the equipment body substantially completely. In this case, a releasing member (11) moves a locking member (4) to a releasing position. Under such situation, a locking portion (7) of the operating unit and a locking portion (6) of the equipment body are aligned in position. The locking member (4) is then turned to a locking position where the locking means is locked to thereby complete the attachment of the operating unit to the equipment body. When the operating unit is to be removed from the equipment body, the releasing member (11) is operated to release the restriction of the locking member (4) by a restricting member (3), and the locking member is turned in a releasing direction to thereby release the locking means and hence remove the operating unit from the equipment body.

21 Claims, 23 Drawing Sheets

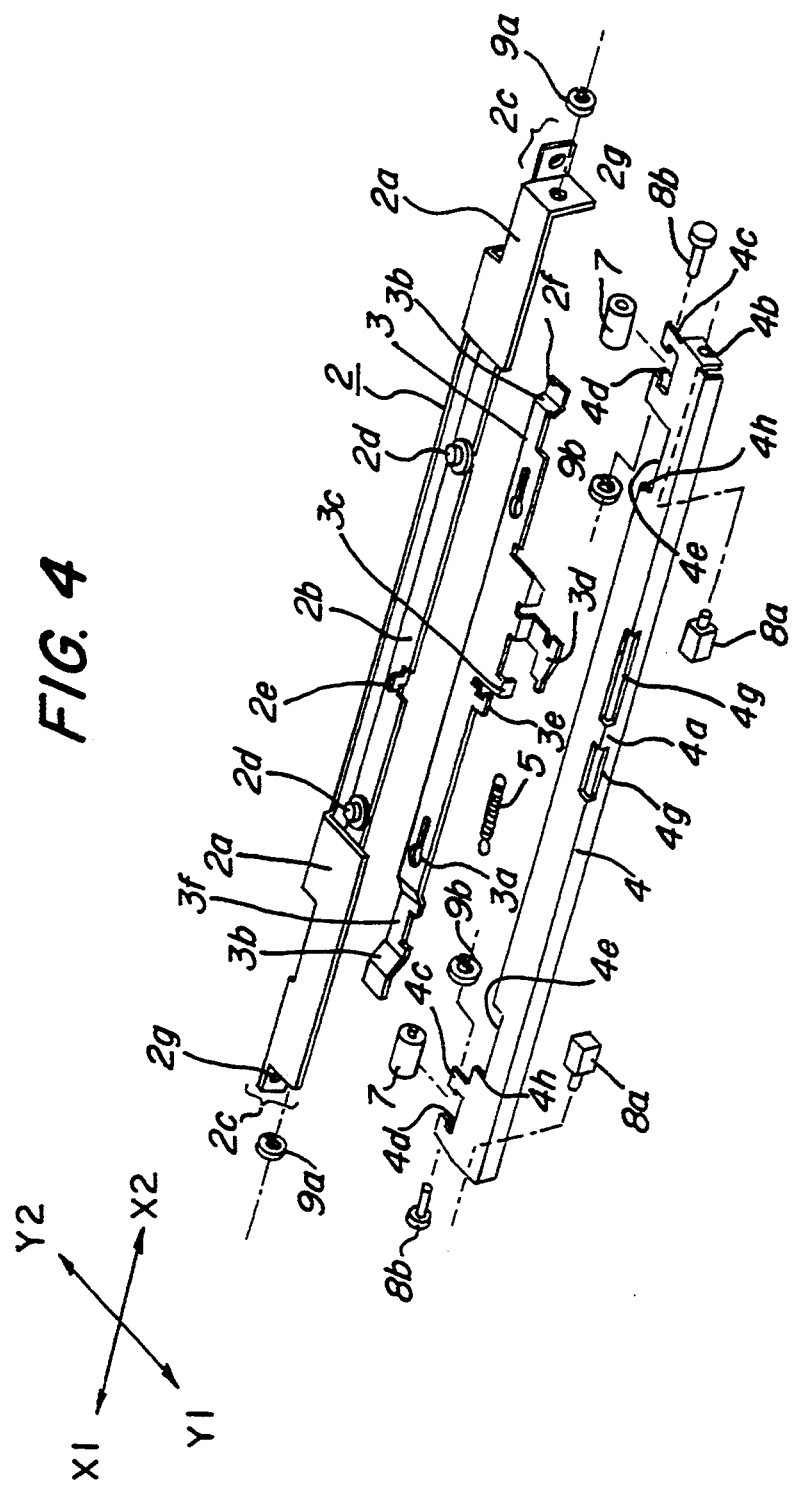

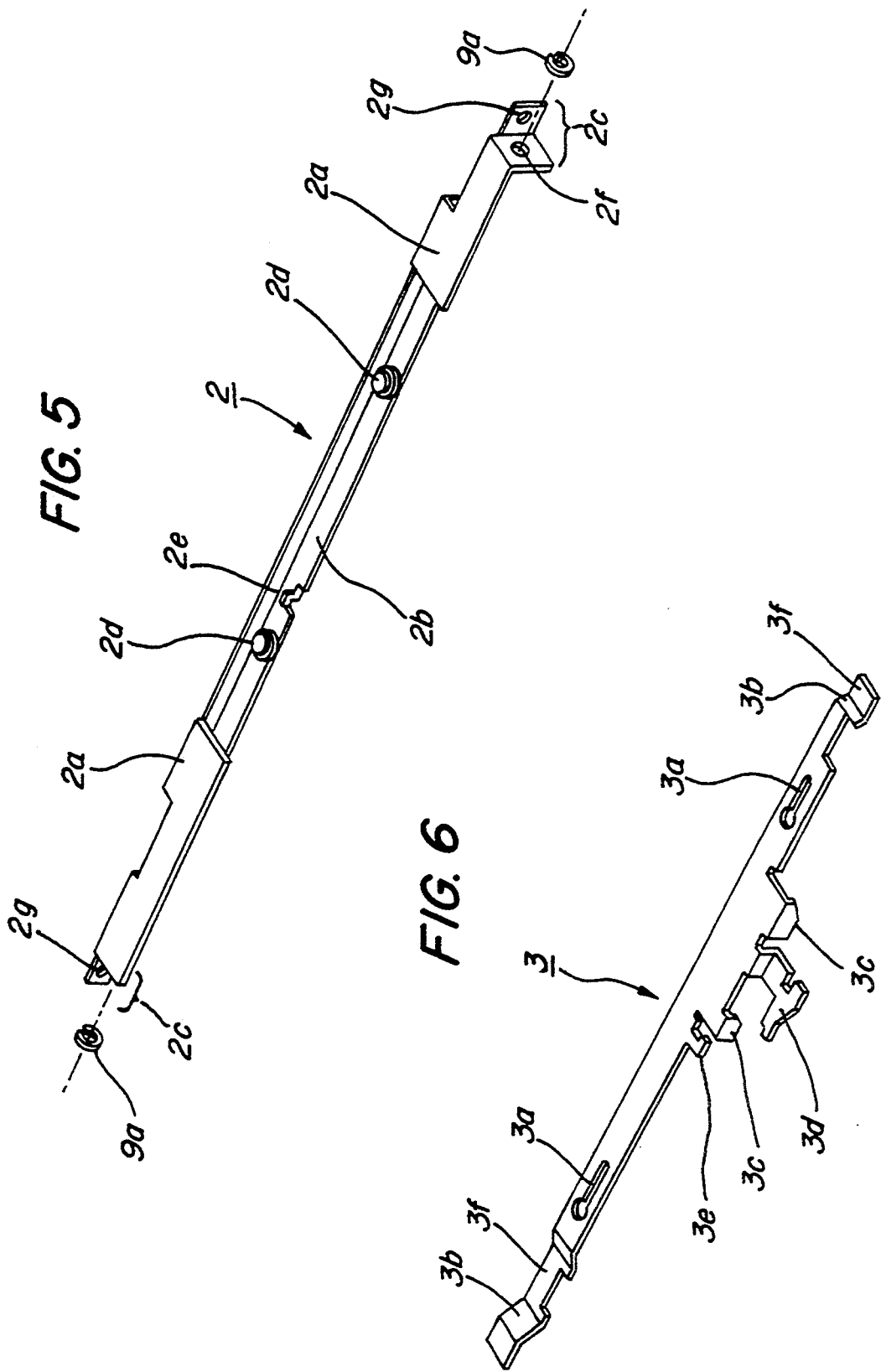

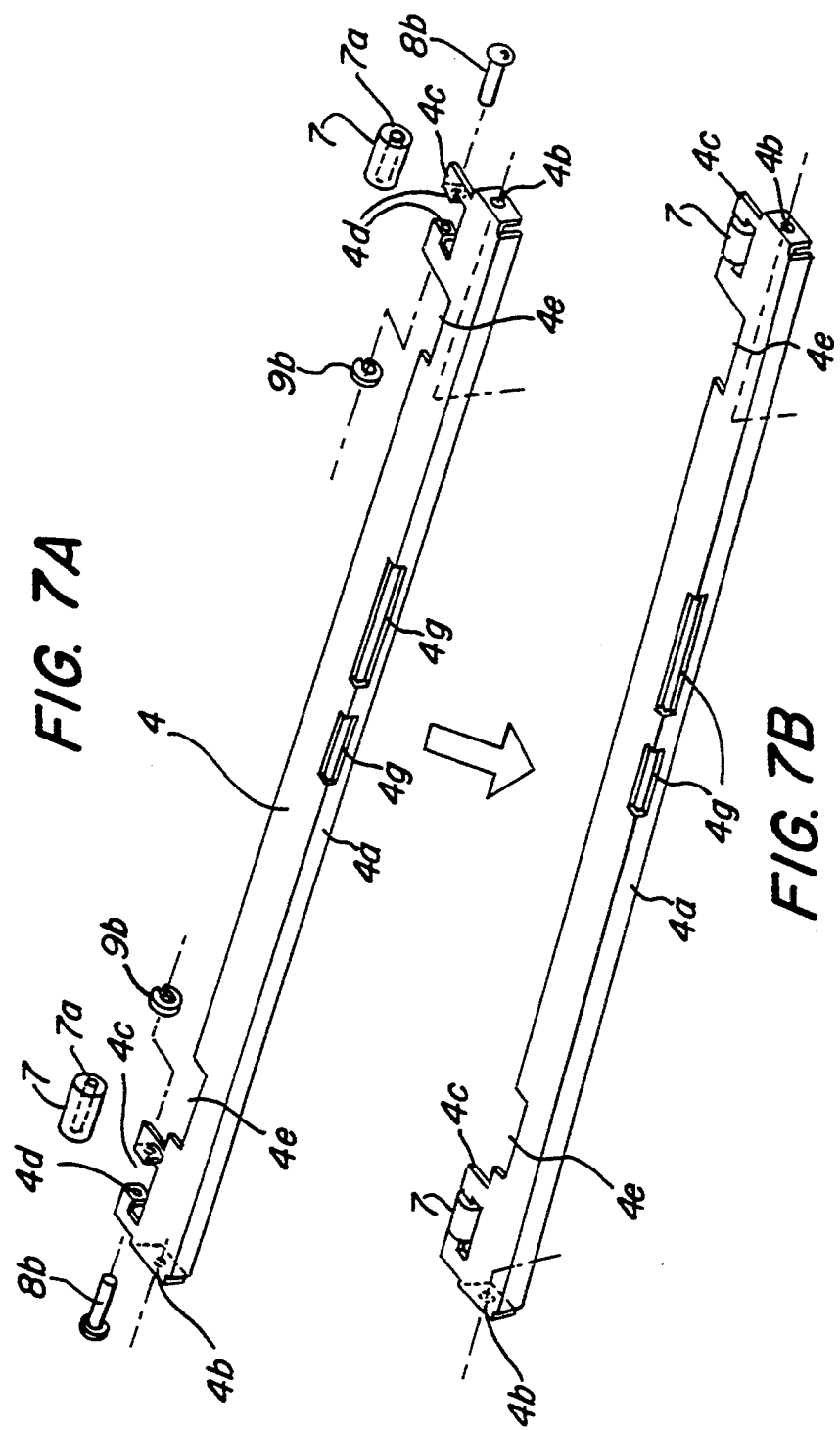

APPARATUS FOR LOCKING AN OPERATING UNIT TO A VEHICLE-MOUNTED ELECTRONIC EQUIPMENT

BACKGROUND OF THE INVENTION

The present invention relates to vehicle-mounted electronic equipment with an operating unit attached removably to an equipment body thereof, and more particularly to an apparatus for locking the operating unit to an equipment body.

Generally, a system is known which removes vehicle-mounted electronic equipment and especially an acoustic device body from a vehicle among various vehicle-mounted electronic equipment; a so-called take-away system, in order to prevent a theft of the vehicle-mounted acoustic device. However, when this system is employed, the vehicle-mounted acoustic device is large-sized and heavy, so that it is inconvenient for the user to remove the acoustic device and carry it. Thus, in actual use, when the user leaves his vehicle for only a short time period, the user does not carry the acoustic device in many cases, so that the function of preventing a theft of the take-away system is not sufficiently utilized.

Recently, acoustic devices have been multiplied in function, so that the weight of the acoustic devices has increased. Therefore, carrying the acoustic device is more troublesome and the rate of use of the theft preventing function has been further reduced and hence the effect of the theft prevention has further been reduced as well. In addition, the recent acoustic devices have a built-in high output amplifier so that directly after the use of the acoustic device, the device body has been raised to a considerably high temperature due to generation of heat in the amplifier. When such high-temperature device is to be carried, there is a danger of the user being burnt.

In order to avoid such danger, a removable operating unit attaching system in which only an operating unit with buttons for operating the device is removed from the device body has been proposed. In this system, when the user leaves his vehicle, he removes only the operating unit from the device body so as to disable the operation of the device body.

In such removable operation unit attaching system, only the operating unit which is very light, compact and convenient to carry compared to the device body is required to be carried, so that the rate of use of the theft preventing function is greatly increased to thereby ensure a high theft preventing effect. Since the operating unit is provided with no elements which would be heated by heat produced by the amplifier, there is no danger of the user being burnt in portage and hence the operating unit is excellent from a standpoint of safety. The removable operating unit attaching system has such advantages, so that the demand therefor tends to increase, and various operating units having various sizes and shapes have been developed at present.

For example, a large operating unit having the same size as the front panel of an acoustic device has been proposed. Such an operating unit is constructed such that when it is removed by the user from the device body, the device body is completely disabled. After such operating unit is removed, no operating buttons, which would cause one to recognize the acoustic device, are disposed on the front panel of the device body left on the vehicle. Such structure greatly reduces a probability of theft of the device body left on the vehicle or produces an excellent theft preventing effect advantageously.

In the vehicle-mounted acoustic device with such operating unit, an operating unit locking apparatus which locks the operating unit to the device body is required to prevent slippage of the operating unit from the vehicle due to vibrations of the vehicle. Especially, when the operating unit is large-sized, a locking device which provides a large locking force is required. Therefore, an operating unit locking apparatus is required to be realized which provides a large locking force, is capable of locking the operating unit securely and easily to the vehicle, and removing the operating unit easily.

SUMMARY OF THE INVENTION

Such problem with the prior art is solved by the present invention. The present invention provides an apparatus for locking and unlocking an operating unit (e.g. 10) of vehicle-mounted electronic equipment to a surface of its electronic equipment body (e.g. 20), comprising engaging means for disengageably engaging a part of the equipment body and a part of the operating unit with each other, using the engaging relationship between a convexity and a concavity formed on those parts, and locking means for unlockably locking up a part of the equipment body and a part of the operating unit, using the engaging relationship between a convexity and a concavity formed on those parts. The engaging means comprises a first engaging portion (e.g. 13) provided in any one of the equipment body and the operating unit and a second engaging portion (e.g. 24) provided in the other of the equipment body and engageable with the first engaging portion, The locking means includes a locking member which, in turn, includes a first locking portion (e.g. 6) provided in any one of the equipment body and the operating unit, and a second locking portion (7) provided in the other of the equipment body and the operating unit. The locking member is provided so as to be turnable.

The locking member is movable between a locking position where said second locking portion of the locking member locks up the first locking portion and a releasing position where said second locking portion unlocks said first locking portion. The locking means includes restricting means (e.g. 3) which restricts the turning of the locking member to hold the locking member at the locking position.

In the typical embodiment of the present invention, the restricting means comprises a restricting member (e.g. 3) which is movable between a restricting position where the turning of the locking member is restricted and a releasing position where said locking member is released, a biasing member (e.g. 5) for normally biasing the restricting member toward the restricting position and a releasing member (e.g. 1i) for driving the restricting member to the releasing position. In another embodiment, the restricting means comprises a biasing member (e.g. 38) for normally biasing the locking member (e.g. 4) toward the locking position and a release member (e.g. 36) for driving the locking member toward the releasing position. In addition, in the present invention, the operating unit is generally turnable within a predetermined range relative to the equipment body around the engaging means in a state in which the engaging means is engaged.

When the operating unit (10) is attached to the equipment body (20) in the inventive locking apparatus, the engaging means engages the part of the equipment body and the part of the operating unit. The locking means locks up a different part of the equipment body and a different part of the operating unit. In this case., especially in the locking means, the turning of the turning locking member (4) is restricted by the restricting means (3) to thereby hold the locking member at the locking position and hence ensure the fixing of the equipment body and the operating unit.

Such attachment is generally performed as follows. First, the first and second engaging portions (13, 24) of the engaging means are engaged. The operating unit (10) is turned around the engaging means in a direction in which the operating unit more greatly contacts the equipment body (20). By such rotation, the releasing member (11) moves the locking member (4) to the releasing position. Under such conditions, the locking member (7) of the operating unit and the locking portion (6) of the equipment body are aligned. The locking member (4) is then turned to the locking position to thereby lock the locking means and hence complete attachment of the operating unit to the equipment body.

When the operating unit is to be removed from the equipment body, the releasing member (11) is operated to release the restriction of the locking member (4) by the restricting member (3) to turn the locking member in the releasing direction to release the locked state.

BRIEF DESCRIPTION OF THE INVENTION

FIG. 1-16 show a typical embodiment of a CD player to which an operating unit locking apparatus according to the present invention is applied;

FIG. 1 is a front view of an operating unit;

FIG. 2 is a side cross-sectional side view of the operating unit of FIG. 1;

FIG. 3 is a perspective view of an equipment body as viewed in its front;

FIG. 4 is an exploded perspective view of a locking mechanism provided in the operating unit of FIG. 1;

FIG. 5 is a perspective view of a plate holder which constitutes a part of the locking mechanism of FIG. 4;

FIG. 6 is a perspective view of a release plate 4; which constitutes a part of the locking mechanism of FIG. 4;

Figure 3:
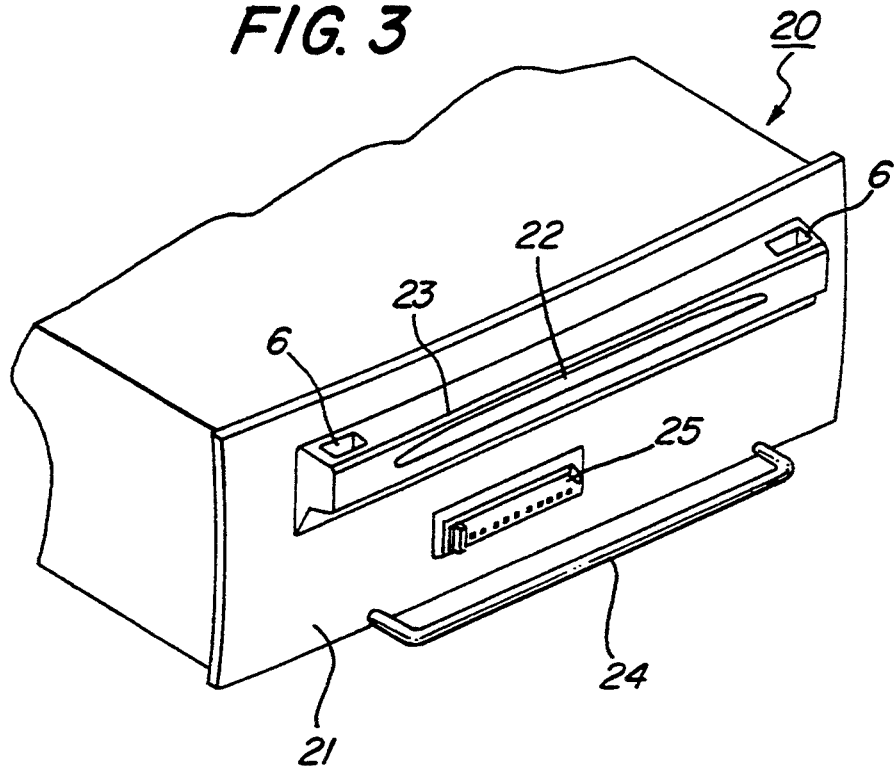
Figure 8:
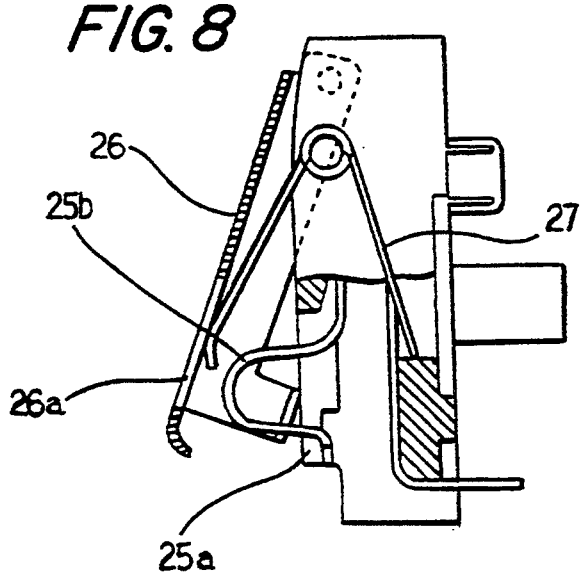
Figure 9:
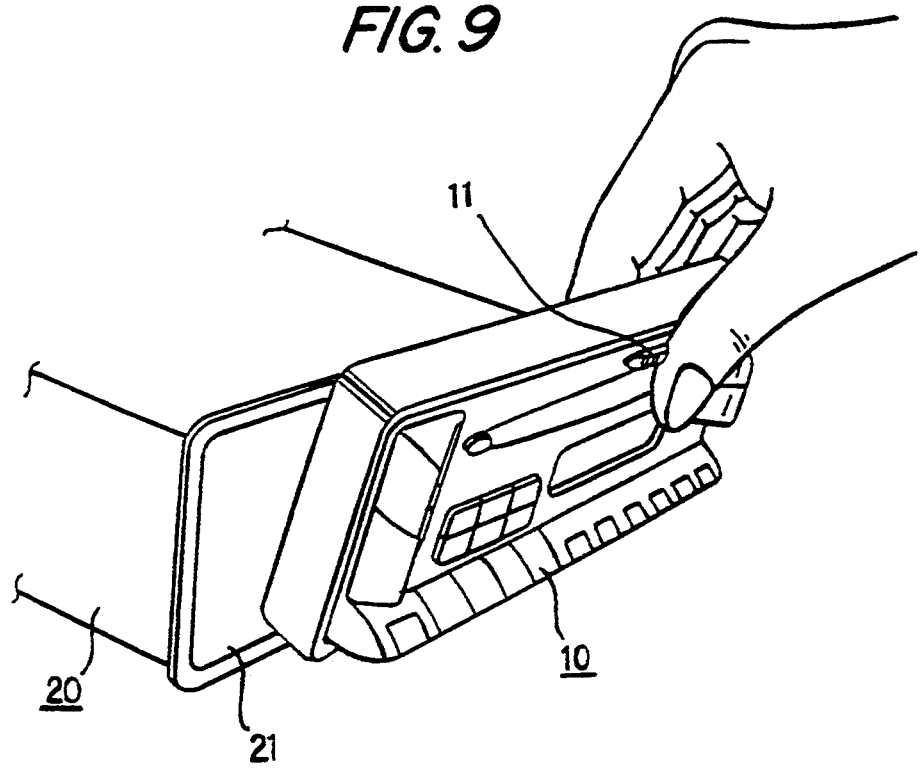
Figure 10:
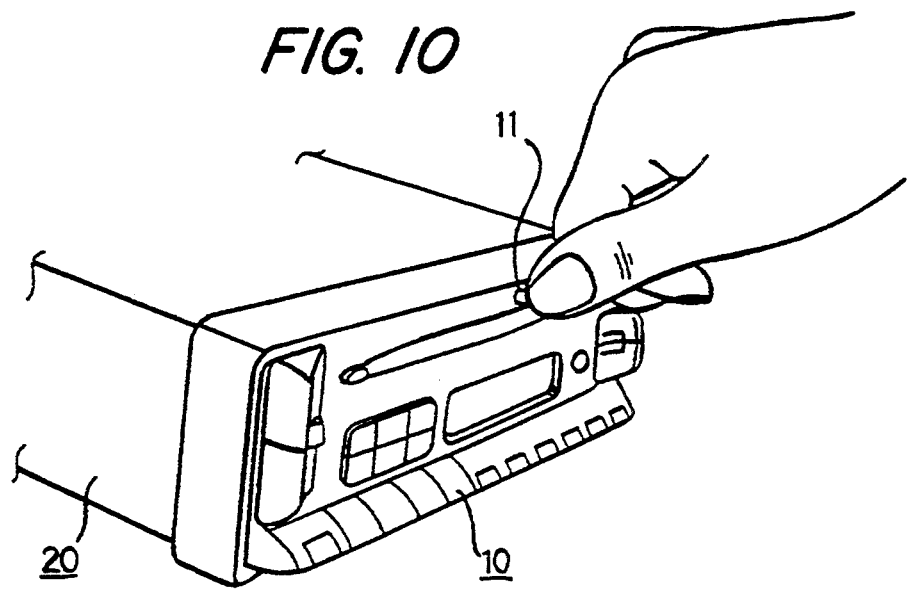
Figure 11:
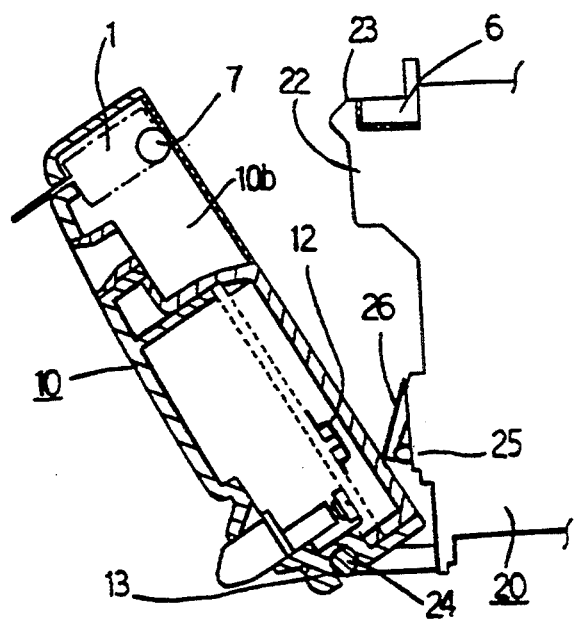
Figure 12:
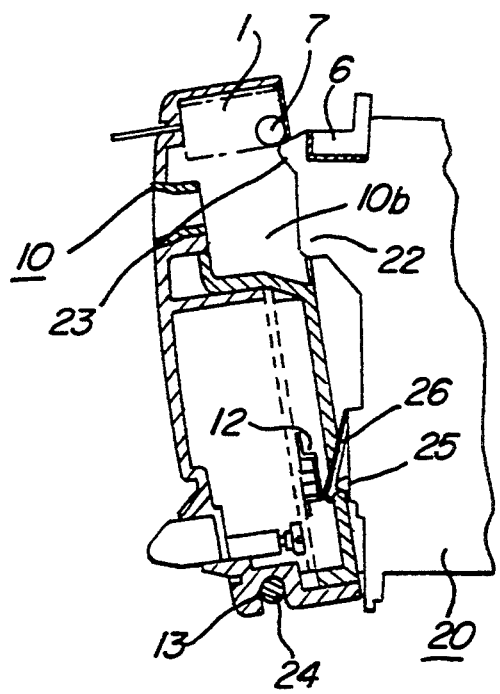
Figure 13:
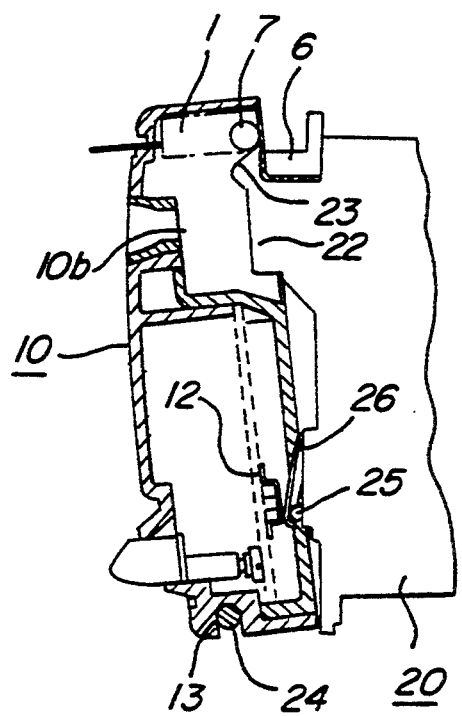
Figure 14:
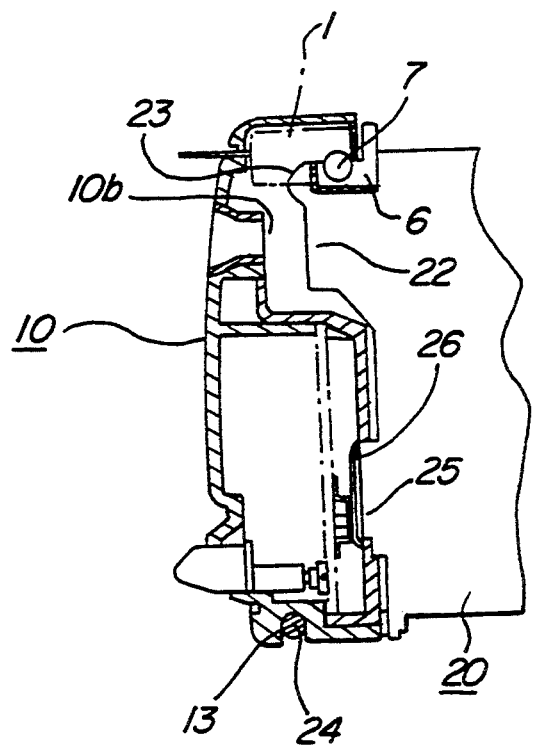
Figure 15:
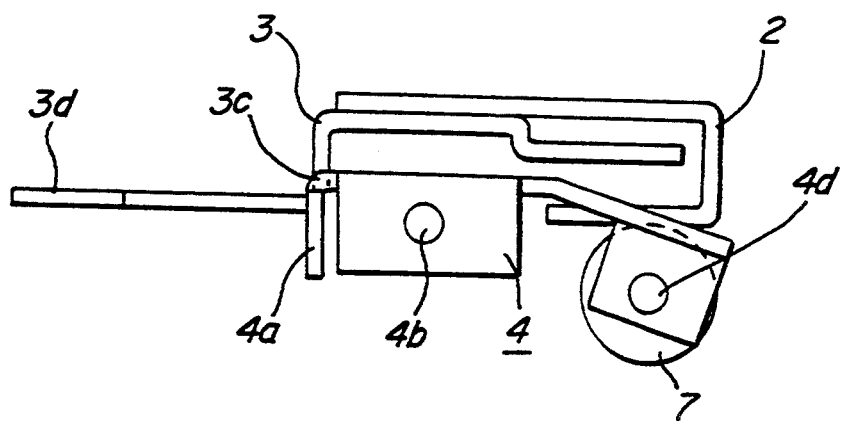
Figure 16:
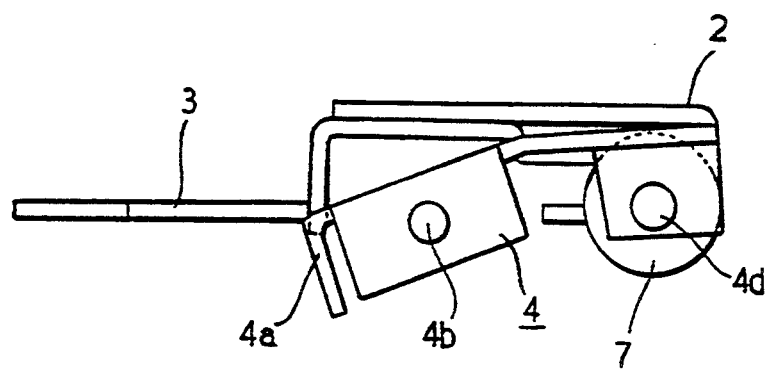
Figure 17:
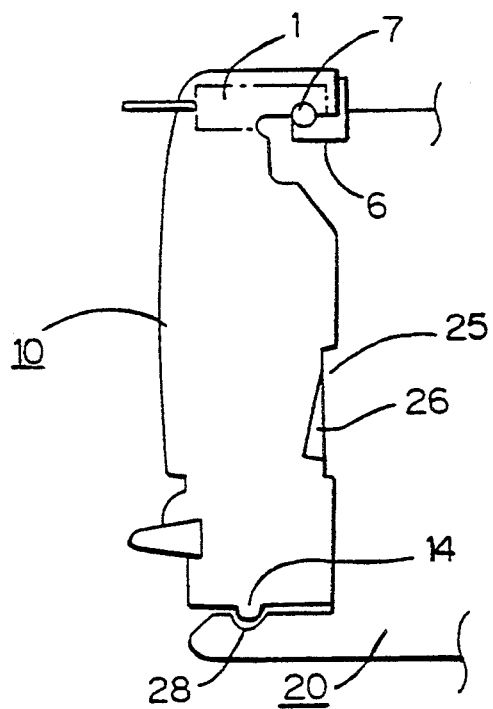
Figure 18:
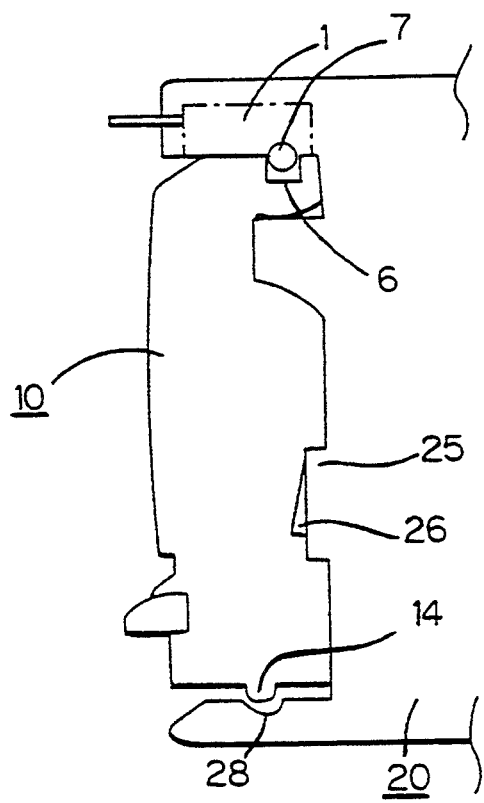
Figure 19A:
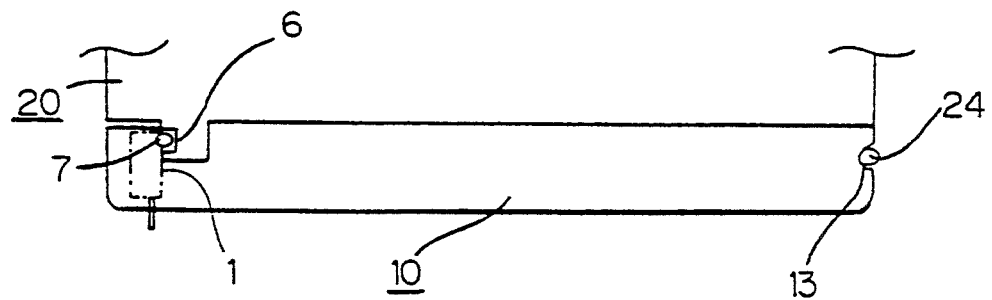
Figure 19B:
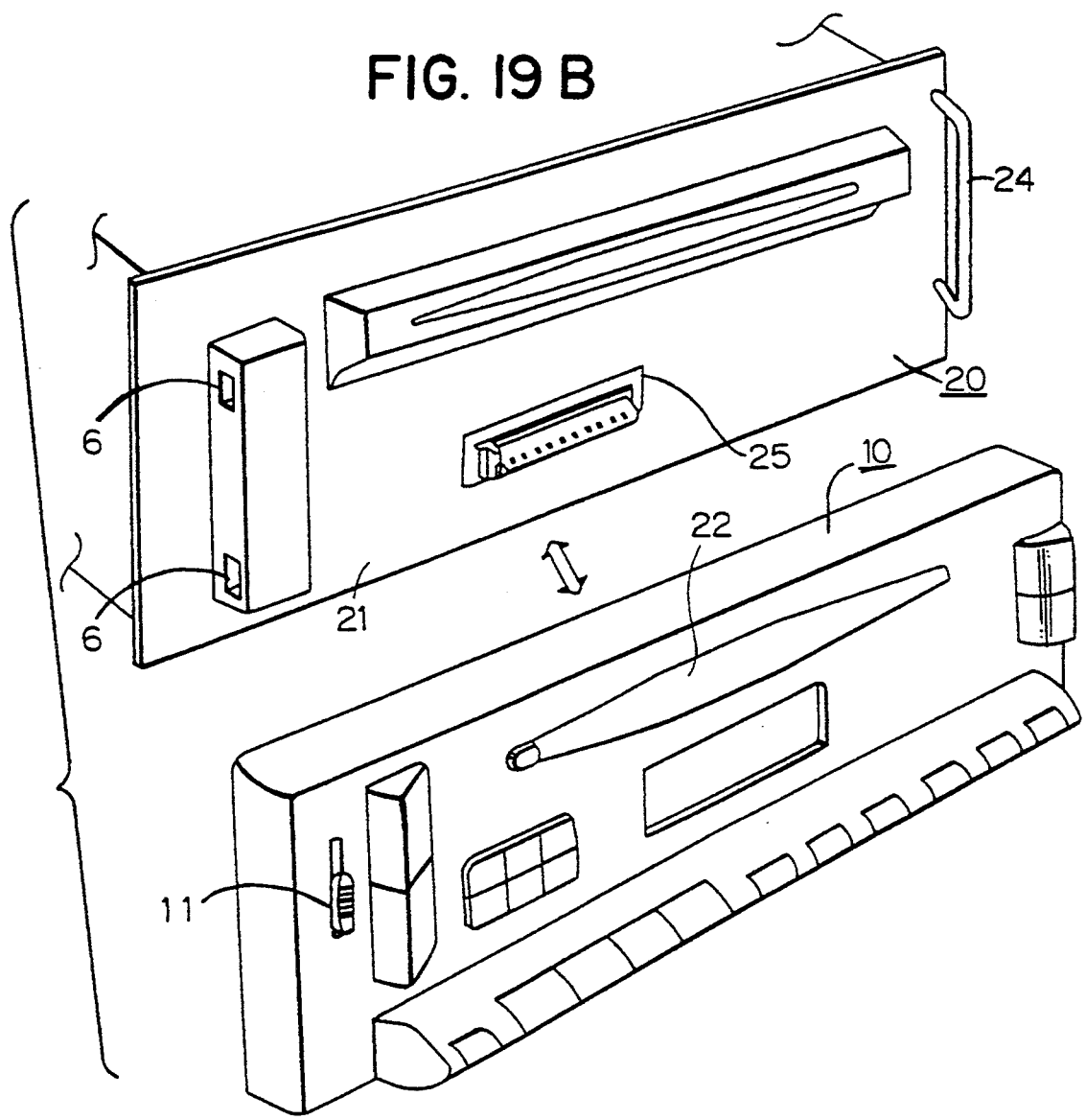
Figure 20:
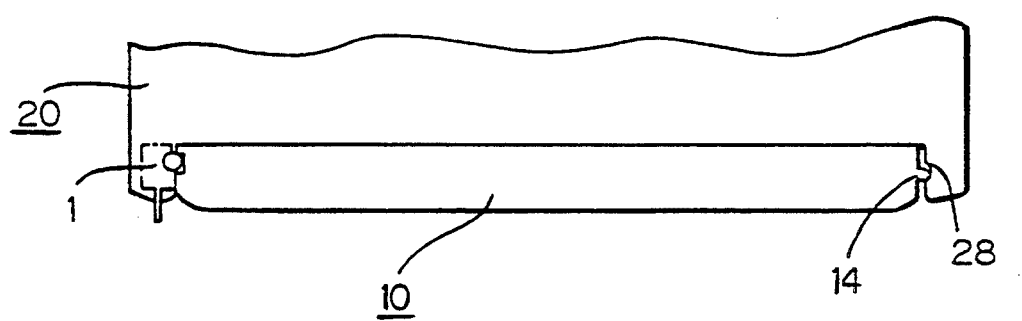
Figure 21:
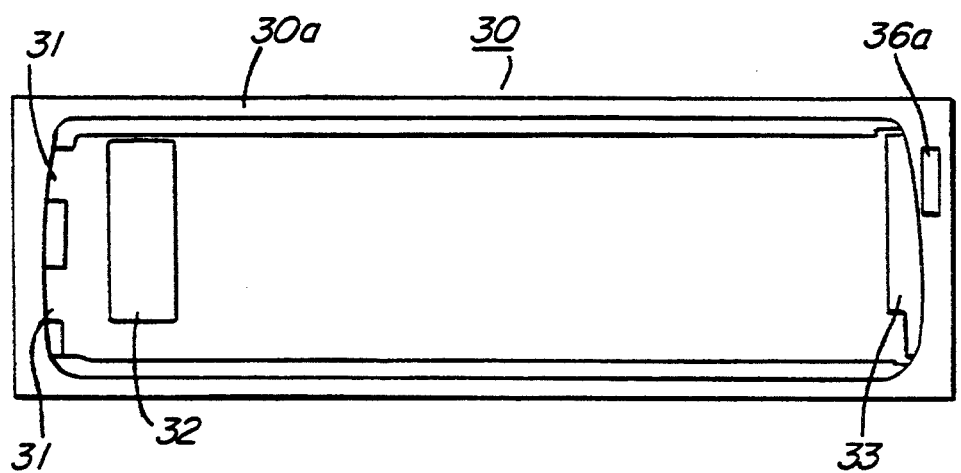
Figure 22:
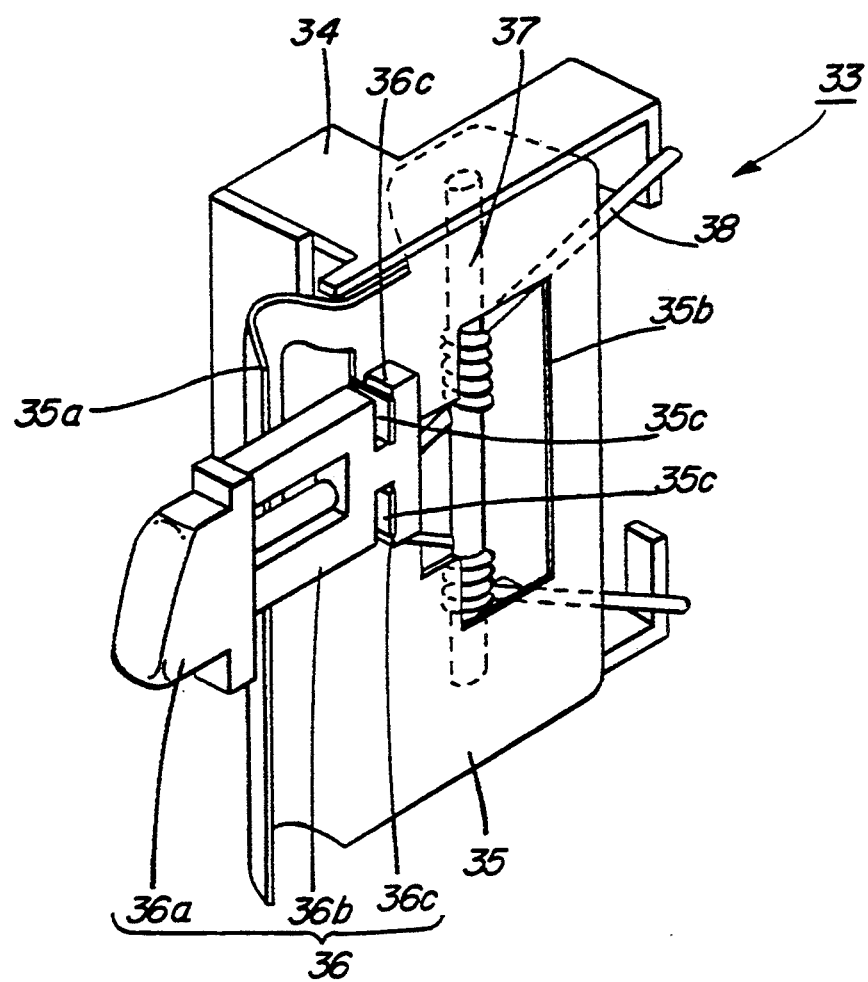
Figure 23:
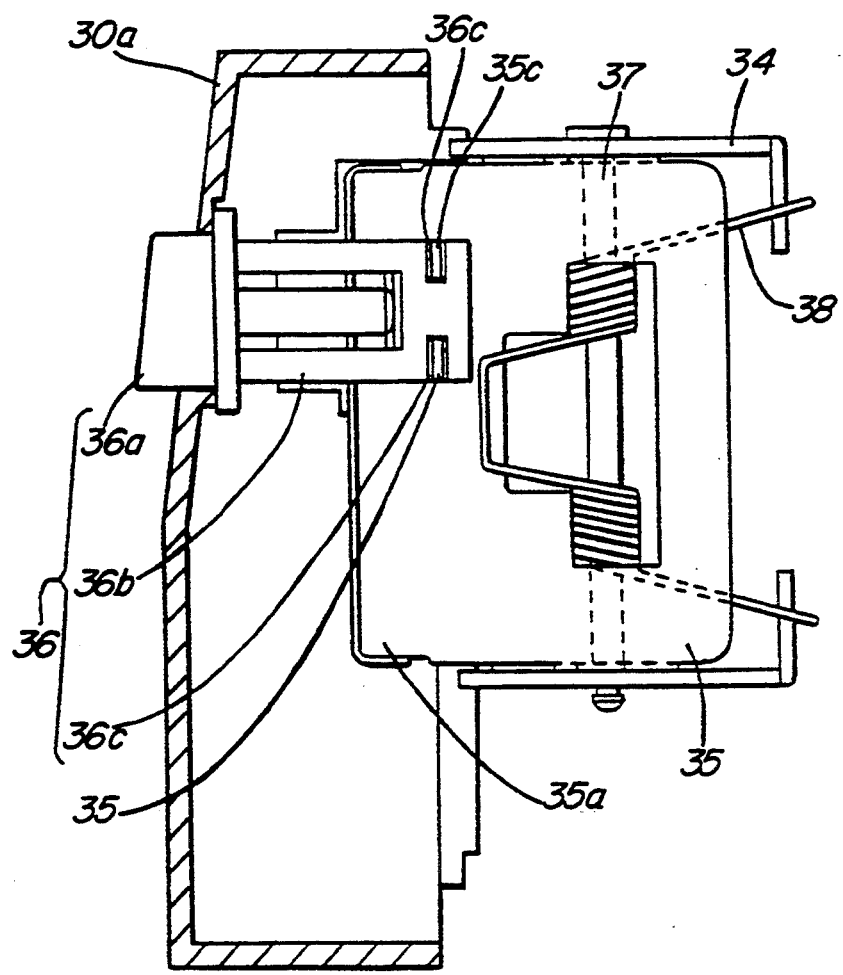
Figure 24:
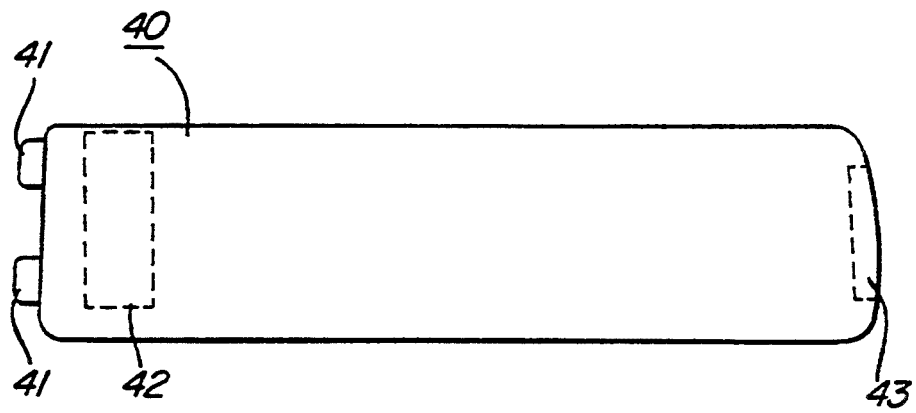
Figure 25:
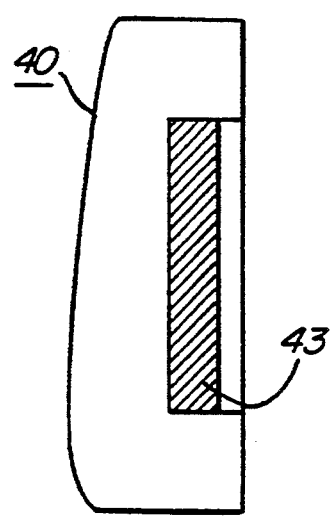
Figure 26:
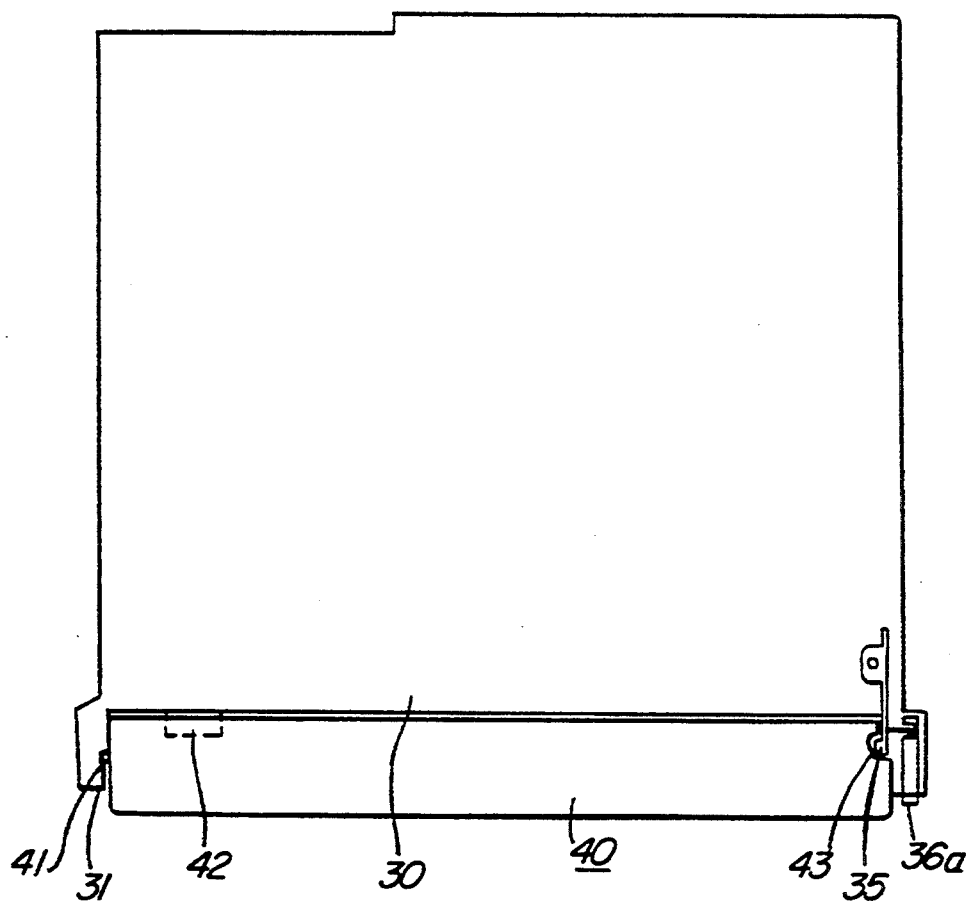
Figure 27:
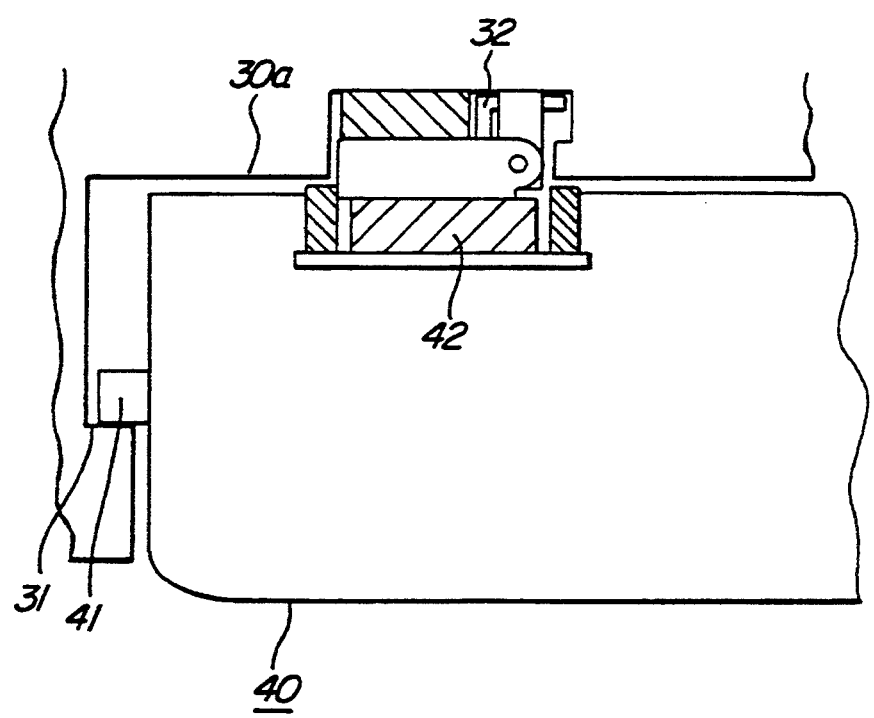
Figure 28:
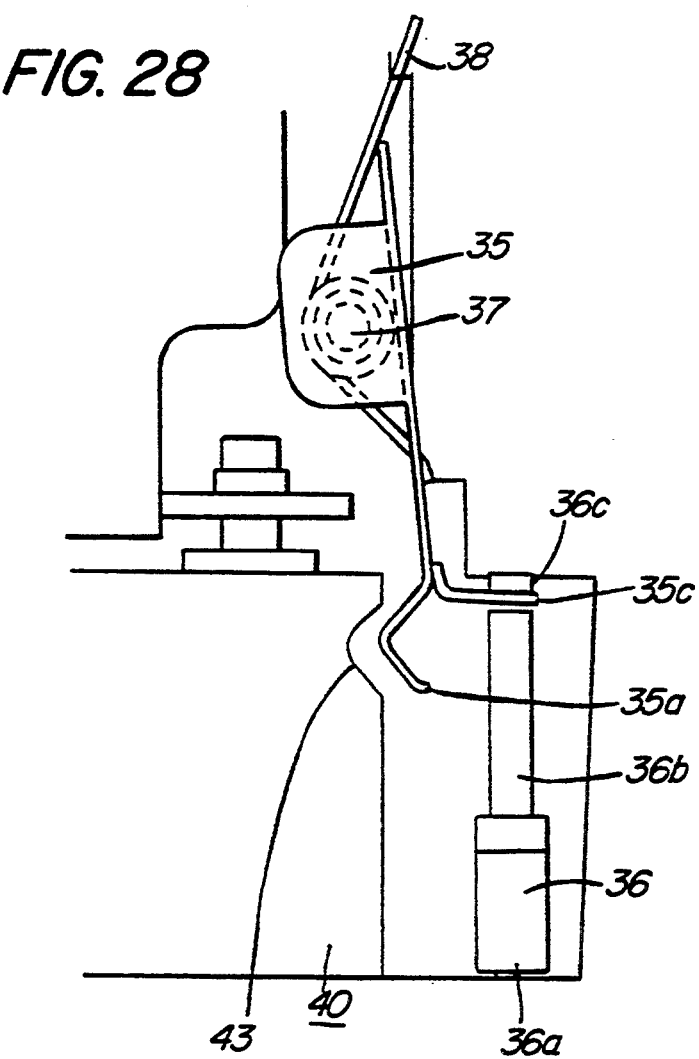
Figure 29:
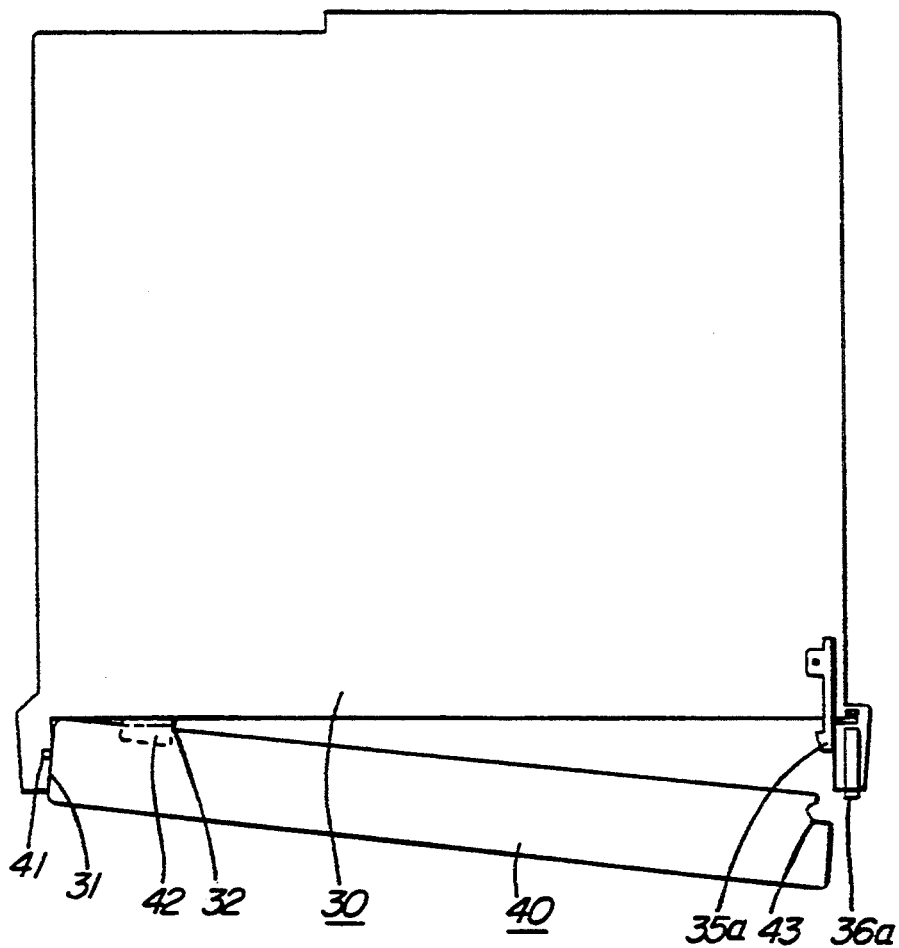
Figure 30:
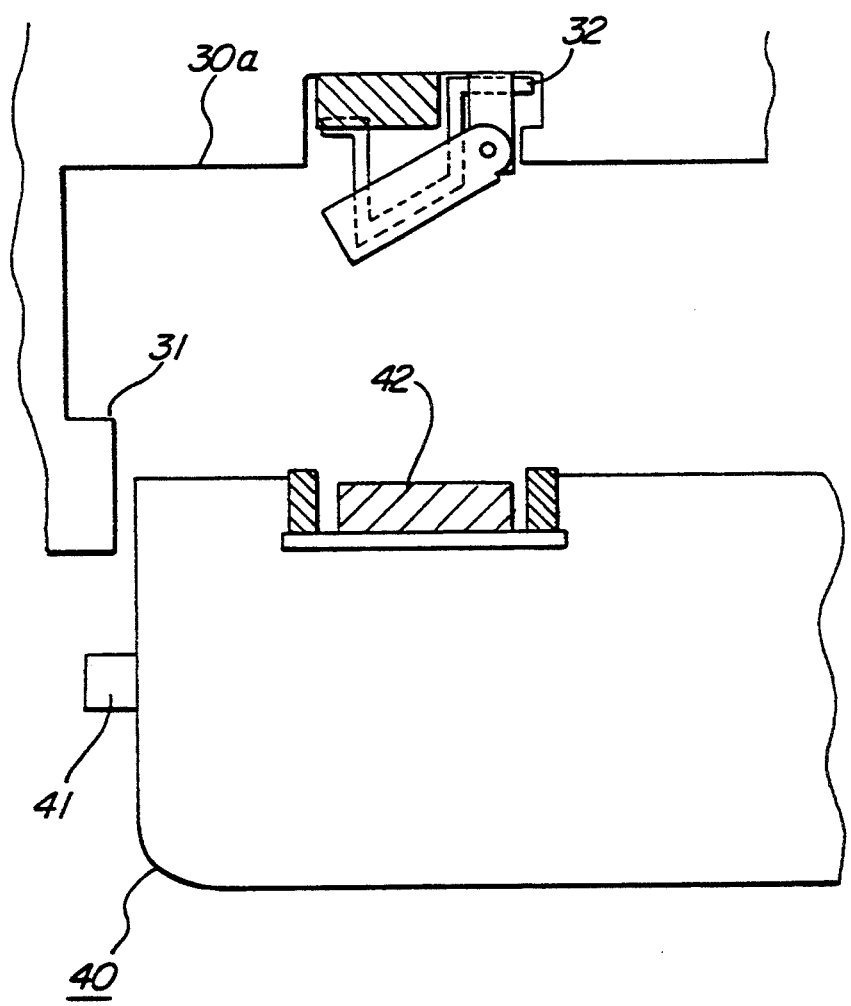
Figure 31:
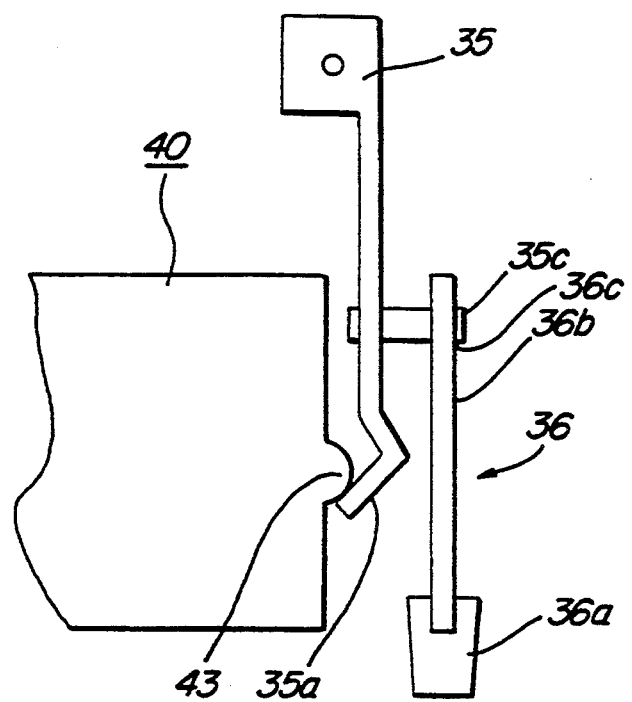

FIG. 7(A) and FIG. 7(B) are perspective views of a flap which constitutes a part of the locking mechanism of FIG. 4;

FIG. 7(A) is an exploded perspective view while FIG. 7(B) is an assembled perspective view;

FIG. 8 is a cross-sectional side view of a connector provided in the equipment body of FIG. 3;

FIG. 9 and 10 show the overall mechanism of the equipment body and the operating unit;

FIG. 9 is a perspective view of the operating unit removed from the equipment body;

FIG. 10 is a perspective view of the operating unit attached to the equipment body;

FIG. 11-13 are cross-sectional side views sequentially illustrating the steps of a process in which a support member of the equipment body is engaged in a groove in the operating unit while rollers of the operating unit are removed from concavities in the equipment body;

FIG. 14 is a cross-sectional side view of the equipment body and the operating unit in attached relationship;

FIG. 15 is a side view of the locking mechanism of FIG. 4, showing the initial state of the locking mechanism;

FIG. 16 is a side view of the locking mechanism of FIG. 4, showing the operating state of the locking mechanism;

FIGS. 17-20 each show a modification of the embodiment of FIG. 1-16;

FIG. 17 is a side view of engaging means which is provided With a groove in the equipment body and an engaging protrusion provided in the operating unit;

FIG. 18 is a side view of a locking apparatus which is provided with a locking mechanism in the equipment body and a first locking portion such as a concavity provided in the operating unit;

FIG. 19 shows a locking apparatus which is provided with a groove provided in the right-hand side of the operating unit, a support member provided at a position in the equipment body corresponding to the position of the groove; and a concavity provided in the left-hand side of the equipment body, and a lock mechanism provided at a position in the operating unit corresponding to that of the cavity;

FIG. 19(A) is a partial plan view;

FIG. 19(B) is an exploded perspective view;

FIG. 20 is a contrast to FIG. 19 and is a partial plan view of a locking apparatus which is provided with a groove in the right-hand side of the equipment body, a support member provided at a position in the operating unit corresponding to the position of the groove; and a concavity provided in the left-hand side of the operating unit, and a locking mechanism provided at a position in the equipment body corresponding to the position of the last-mentioned concavity;

FIGS. 21-30 shows a second typical embodiment of the present invention where the operating unit locking apparatus is applied to a CD player;

FIG. 21 is a front view of the equipment body;

FIG. 22 is a perspective view of a locking mechanism provided on the equipment body of FIG. 21;

FIG. 23 is a side view of the locking mechanism;

FIG. 24 is a front view of the operating unit;

FIG. 25 is a side view of the operating unit;

FIG. 26 is a plan view of the whole of the operating unit locking apparatus;

FIG. 27 is a partial plan view of the essential portion of the operating unit locking apparatus;

FIG. 28 is a partial plan view of the locking mechanism in operation;

FIG. 29 is a plan view of the overall operating unit locking apparatus where the operating unit is shown as belng turned;

FIG. 30 is a partial plan view of the equipment body and the operating unit removed from the equipment body;

FIG. 31 is a fragmentary plan view of a modification of the embodiment of FIGS. 21-30.

DETAILED DESCRIPTION

A plurality of embodiments of an operating unit locking apparatus according to the present invention will be described specifically with reference to the drawings.

(1) Structure of a Typical Embodiment (FIGS. 1-8)

First, a typical embodiment of the operating unit locking apparatus according to the present invention applied to a vehicle-mounted CD player shown in FIGS. 1-3 will be described below.

Figure 1:
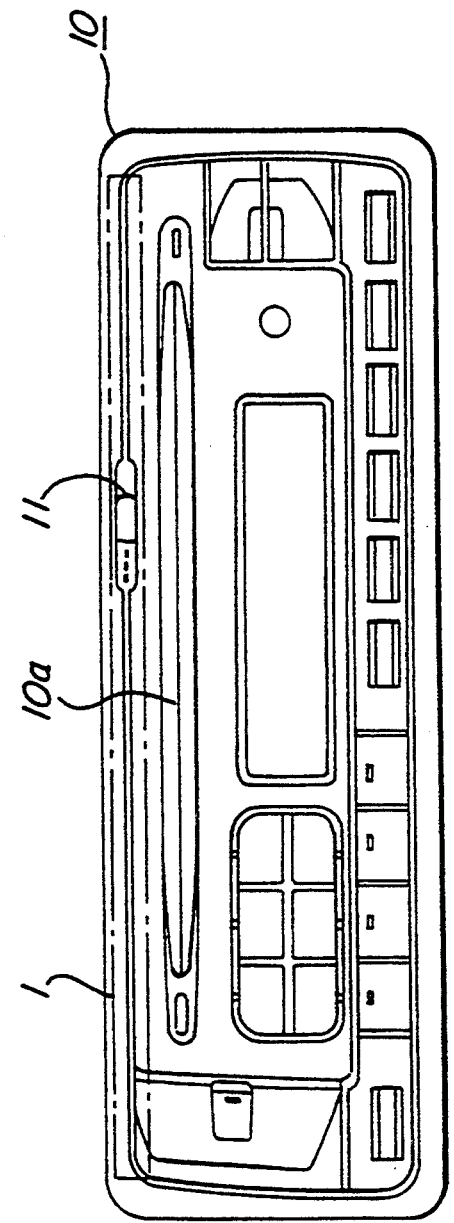
Figure 2:
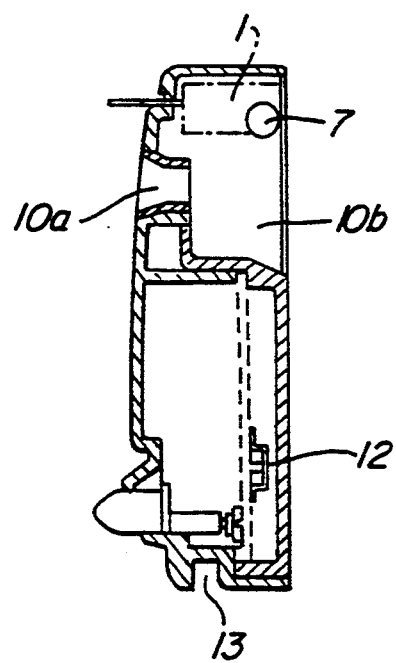

Outline of a Vehicle-Mounted CD Player (FIGS. 1–3)

A vehicle-mounted CD player shown in FIGS. 1–3 is composed of an equipment body 20 fixed to the vehicle and an operating unit 10 attached removably to the equipment body 20.

As shown in FIGS. 1 and 2, the operating unit 10 takes the form of a thin oblong box having a small depth and an aspect ratio of about 1 to 3. The front of the operating unit 10 covers the front of the equipment body 20 and has the same size as the front of the equipment body 20. The front of the operating unit 10 has thereon all operating buttons required for operating a CD player. The operating unit 10 has a longitudinally or horizontally long CD insertion slot 10a in the vicinity of an upper edge of the operating unit 10. A substantially elliptical release button 11 which protrudes slightly forward is provided slidably horizontally above the insertion slot 10a. The release button 11 is attached to a locking mechanism 1, whose position is shown by a dot-dashed line in FIGS. 1 and 2, and which is the main element in the present invention.

As shown in FIGS. 1 and 2, the locking mechanism 1 has a horizontal or longitudinal length greater than the CD insertion slot 10a in the operating unit 10. A pair of rollers 7 is disposed as a second locking portion according to the present invention on the back of the locking mechanism 1. Provided behind the CD insertion slot 10a of the operating unit 10 is an engaging space 10b into which a CD insertion unit 22 provided on the equipment body 20 is fitted as shown in FIG. 3. The operating unit 10 has at its lower back a connector 12 which is electrically connected to the equipment body 20. The operating unit 10 has in a lower surface a groove 13 into which a forwardly protruding support member 24 of the equipment body 20 shown in FIG. 3 is fitted.

As shown in FIG. 3, the equipment body 20 has a front panel 21 made of a resin trimmed plate showing an excellent appearance because it is exposed when the operating unit 10 is removed. The CD insertion unit 22 is composed of a horizontally long prismatic member which is fitted into the engaging space 10b in the operating unit 10, as mentioned above, the front of the CD insertion unit 22 has at an upper edge a forward downward tiling portion 23.

The CD insertion unit 22 has a pair of downward extending rectangular concavities 6 one on each upper surface end of the CD insertion unit 22. The concavities 6 correspond to a first locking portion in the present invention and receives the pair of rollers 7 of the first locking mechanism 1. That is, the rollers 7 are disposed below the respective ends of the locking mechanism 1 so as to face the respective concavities 6. The details of the locking mechanism 1 which includes the rollers 7 will be described in more detail later. The forwardly protruding support member 24, which as shown in FIG. 3, takes the form of a U made of a horizontally extending shaft portion and a pair of arms which supports the shaft portion to the front panel 21 and is adapted to fit into the groove 13 in the operating unit 10, as mentioned above.

In this case, the groove 13 corresponds to a first engaging portion in the present invention while the support member 24 corresponds to a second engaging portion in the present invention. In a state where the support member 24 is fitted into the groove 13, the operating unit 10 is turnable around a long shaft portion of the support member 24 relative to the equipment body 20.

A connector 25 which is electrically connected to the connector 12 is provided on the front panel 21 at a position corresponding to that of the connector 12. The details of the connector 25 will be described in more detail later.

A typical embodiment of the operating unit locking apparatus according to the present invention provided in the vehicle-mounted CD player will be described below. The locking means of the operating unit locking apparatus of the present embodiment is composed of the locking mechanism 1 provided on the operating unit 10, and concavities 6 provided in the equipment body 20. The positions and shapes of the concavities 6 are already described as a part of the description of the equipment body of the vehicle-mounted CD player, so that the structure of the locking mechanism 1 will be described in detail below.

Structure of the Locking Mechanism (FIGS. 4–7(A) and 7(B))

As shown in FIGS. 4–7(A) and (B), the locking mechanism 1 which is the main element in the present invention is composed of a plate holder 2, release plate 3 and flap 4, the directions X1 and X2 of FIG. 4 are referred to as left-hand and right-hand sides, respectively, while the directions Y1 and Y2 of FIG. 4 are referred to as the forward and backward, respectively.

Plate Holder (FIG. 5)

As shown in FIGS. 4 and 5, the plate holder 2 is a thin horizontally long plate member attached on an inner surface of an upper section of the operating unit 10 shown in FIG. 2. The plate holder 2 is provided with a pair of upper horizontal sections 2a one at each of the respective ends of the holder 2, and a lower horizontal section 2b which extends below and between the upper sections 2a. The plate holders 2 are provided with an L-like attaching member 2c at a respective outer end of the upper sections 2a. The lower horizontal section 2b is provided with a pair of spaced upward protruding guide pins 2d fixed at a predetermined spacing. An upward protruding hook 2e is formed in the vicinity of the left-hand guide pin 2d between the two guide pins 2d.

Both the attaching members 2c each are provided with a transverse piece adjacent to the upper section 2a and a longitudinally extending piece connected to a rear edge of the transverse piece. Each transverse piece has a fixing hole 2f while each longitudinally extending piece has a fixing hole 2g in which a screw (not shown) is inserted to thereby fix the plate holder 2 to an upper section of the operating unit 10.

Release Plate (FIG. 6)

A release plate 3 corresponds to a restricting member used in the present invention. As shown in FIGS. 4 and 6, the release plate 3 is composed of a thin horizontally extending strip-like member superimposed slidably on the horizontal surface 2d of the plate holder 2 of FIG. 5. The release plate 3 has an axially extending guide slot 3a in the vicinity of each end thereof. The two guide pins 2d on the plate holder 2 are inserted into the corresponding guide slot 3a such that the release plate 3 is slidably attached to the plate holder 2. The release plate 3 has at each end an L-like piece made of outwardly downward tilted piece 3b and a horizontal flexible piece 3f connected to the tilted piece 3b. The flexible piece 3f is smaller in width than another portion of the release plate 3 such that a resiliency is imparted to the flexible piece 3f to render the piece 3f vertically flexible.

The release plate 3 has a forwardly expanding central portion which has a pair of downwardly protruding press portions 3c spaced by a predetermined distance. The press portions 3c each have a left downward tilted side at its right-hand edge. A further forwardly protruding attaching portion 3d is formed between the press portions 3c such that the release button 11 is attached to the attaching piece 3d. A forwardly protruding hook 3e is formed on the release plate 3 in the vicinity of the left-hand press portion 3c. The hook 3e is formed at a more right-hand position than the hook 2e of the plate holder 2. An extension spring 5 to be described later in more detail is attached between the hooks 2e and 3e. In this case, since the plate holder 2 is fixed in the operating unit 10, the release plate 3 is biased leftward with reference to the plate holder 2 by the attachment of the extension spring 5.

Flap (FIG. 7(A) and 7(B))

A flap 4 corresponds to a locking member used in the present invention. As shown in FIGS. 4, 7(A) and 7(B), the flap 4 is a thin horizontally extending strip-like member which is thinner than the plate holder 2. The flap 4 is attached between the release plate 3 and the lower horizontal surface 2b of the plate holder 2 below the release plate 3 between the upper section 2a and the horizontal surface 2b of the plate holder 2. The flap 4 is provided with a horizontally extending edge 4a as the front of the flap 4.

The flap 4 has at each end an attaching hole 4b corresponding to the attaching hole 2f in the plate holder 2. Each common shaft 8a with a rectangular base is inserted into a set of aligned holes 2f and 4b outward from inside, as shown in FIG. 4. An E-like snap ring 9a is fixed at an end of the shaft 8a to thereby attach the flap 4 rotatably to the plate holder 2. That is, the flap 4 is rotatable upward or downward through a predetermined angle around the attaching holes 4b.

As shown in FIG. 7(A) and 7(B), the flap 4 has a pair of backwardly protruding U-like holders 4c formed at ends of the rear edge thereof. Each holder 4c has a pair of opposing shoulders which is formed on the inner sides of the arms of the U with the shoulders each having a small hole 4d. Each cylindrical roller 7 which is the second locking portion is disposed between the corresponding small holes 4d with the roller 7 having a central through hole 7a extending axially therethrough. A shaft 8b having a flange-like base is inserted from outside into the aligned holes 7a, 4d. An E-like snap ring 9b is fixed to an end of the shaft 8b to thereby attach the roller 7 rotatably to the flap 4. As the flap 4 turns, each roller 7 is movable between a lower position where the roller 7 is fitted into the corresponding concavity 6 in the equipment body 20 and an upper position where the roller 7 is released from the concavity 6.

The flap 4 has a pair of notches 4e which is capable of receiving the corresponding pair of tapering pieces 3b of the release plate 8 adjacent to the corresponding inner arms of the holder 4c. Each notch 4e has its left-side as an abutting edge 4h. When each notch 4e receives the corresponding tapering piece 3b, the corresponding flexible portion 3f of the release plate 3 rides over the corresponding abutting edge 4h.

The flap 4 has a longer and a shorter pressed groove 4g at the center of the front 4a thereof. The grooves 4g receive the press portion 3c of the release plate 3 such that the press portions 3c abut at their tilted sides on the right-hand edges of the pressed grooves 4g, respectively.

Connector (FIG. 8)

The connector 25 of the equipment body 20 is constructed, as shown in FIG. 8. The connector 25 has a longitudinal extending cavity therein. The connector 25 has a plurality of longitudinally or horizontally extending rectangular openings 25a along and in the vicinity of a lower edge thereof. The connector 25 has in its inner cavity fixed connector pins 25b each having a portion extending outward from a corresponding opening 25a such that an end of that connector pin 25b contacts the connector 12 of the operating unit 10.

Disposed over the front of the connector 25 is a shielding plate 26 which covers the connector 25 such that the shielding plate 26 is turnable around an upper edge of the connector 25. The shielding plate 26 has at a lower edge an opening 26a corresponding to the corresponding opening 25a. When the shielding plate 26 is turned toward the connector 25, the connector pins protrude outward through the corresponding openings 26a.

A spring 27 is disposed behind the shielding plate 26 to normally bias the shielding plate 26 forwardly and upwardly so as to protrude from the connector 25. When the shielding plate 26 is pushed up by the action of the spring 27, the ends of the connector pins 25a are received inside the shielding plate 26.

(2) Action of the Typical Embodiment (FIGS. 9-16)

In the operating unit locking apparatus of the present embodiment, the operating unit 10 takes a removed state of FIG. 9 and an attached state of FIG. 10. The attachment and removal of the operating unit 10 will be described in detail below.

Attachment of the Operating Unit

In the present embodiment, the operating unit 10 is attached to the equipment body 20 as follows.

First, as shown in FIG. 11, the shaft portion of the support member 24 of the equipment body 20 is fitted into the corresponding portion of the groove 13 in the operating unit 10. At this time, the locking mechanism 1 is in an initial state shown in FIG. 15, which will be described with reference to FIG. 4. In the initial state, the release button 11 is not depressed and no operating external force is applied to the release plate 3 to which the release button 11 is attached. Therefore, the release plate 3 is biased by the extension spring 5 in the fixed direction (leftward in FIG. 4). In this case, the flexible portions 3c of the release plate 3 abuts on the upper surfaces of the abutting edges 4h of the flap 4, so that upward movement of the rear edge of the flap 4 is restricted. Therefore, as shown in FIG. 15, the movement of the rollers 7 attached to the rear edge of the flap 4 in the upward or released direction is restricted.

Then, as shown in FIGS. 12 and 13, the operating unit 10 is turned so as to be lifted toward the front panel 21 around the shaft portion of the support member 24 which is fitted in the groove 13 in the operating unit 10. In this case, the rollers 7 of the locking mechanism 1 which is in the initial state move while contacting the tilted portions 23 of the CD inserting unit 22 of the equipment body 20. Since the tilted portion 23 is tilted upward toward the equipment body 20, the rollers 7 are pushed upward as they advance on the tilted portions 23, so that the locking mechanism 1 is put into an operating state as shown in FIG. 16.

As shown in FIG. 16, as the rollers rise, the rear edge of the flap 4 which hold the rollers 7 is also pushed upward along with the rollers 7, so that the flap 4 is turned counterclockwise, as shown in FIG. 16, or in the release direction around the attaching holes 4b at the ends of the flap 4. As a result, an upward load is applied to each of the flexible portions 3f of the release plate 3 by the corresponding abutting edges 4h of the flap 4. In this case, the flexible portions 3f of the release plate 3 are flexible vertically, so that they are deformed so as to be bent upward. The flexible portions 3f thus deformed apply stresses to and press the abutting edges 4h of the flap 4 downward.

As shown in FIG. 14, when the rollers 7 of the flap 4 arrive at the corresponding concavities 6 in the CD insertion unit 22 of the equipment body 20, the rollers 7 are moved from the flexible portions 3f of the release plate 3 into the corresponding concavities 6 by the downward stresses applied to the flap 4 and fixed there. Therefore, the flap 4 which holds the rollers 7 is turned clockwise in FIG. 14. At this time, the locking mechanism 1 returns to its initial state of FIG. 15 and the operating unit 10 is attached to the equipment body 20, as shown in FIG. 10.

In the attachment of the operating unit 10, the connector 25 of the equipment body 20 performs the following operation. As the operating unit 10 turns toward the front panel 21, the shielding plate 26 of the connector 25 is pressed by the connector 12 of the operating unit 10, so that the shielding plate 26 is turned so as to be folded toward the connector 25 side. As a result, the connector pins 25b protrude outward from the openings 26a of the shielding plate 26 to contact the connector 12 at the ends of the connector pins 25b. By such contact of the connectors 12 and 25, an electric signal from an operating button on the operating unit 10 is transmitted to the equipment body 20 to thereby enable the vehicle-mounted CD player.

Removal of the Operating Unit

In the present embodiment the operating unit 10 is removed from the equipment body 20 as follows.

As shown in FIG. 10, when the operating unit 10 is in an attached state, the locking mechanism 1 of the operating unit 10 is in the initial state as mentioned above; the rollers 7 of the locking mechanism 1 are fitted in the corresponding concavities 6 in the CD insertion unit 22 of the equipment body 20; and the upward movement of the rear edge of the flap 4 which holds the rollers 7 is restricted because the flexible portions 3f of the release plate 3 abut on the upper surfaces of the abutting edges 4h.

When the operating unit 10 which is in such attached state is to be removed from the equipment body 20, the release button 11 of the operating unit 10 is slid in a release or right-hand direction against the action of the extension spring 5 as shown in FIG. 4. By this action, the release plate 3 with the release button 11 is moved rightward or in the release direction, so that the flexible portions 3f of the release plate 3 are removed from the upper surfaces of the abutting edges 4h of the flap 4 to move into the notches 4e along with the tilted porions 3b. Therefore, the abutting edges 4h of the rear edge of the flap 4 are released from the flexible portions 3f of the release plate 3 and the restriction on the flap 4 from above is released, so that the rear edge of the flap 4 is movable in the release or upward direction. That is, the flap 4 is movable in the release direction or counterclockwise in FIG. 16.

When the release plate 3 is further moved in the rightward in a state where the flap 4 is thus released from the release plate 3 and is movable in the release direction, the front edge pressed portions 4g of the flap 4 abutting on the tilted sides of the press portions 3c of the release plate 3 lower along the tilted sides of the press portions 3c. As shown in FIG. 4, since the press portions 3c are tilted left downward, the rightward moving force of the release plate 3 is converted to a torque which lowers the front edge of the flap 4 and hence turns the flap 4 in the counterclockwise or release direction as shown in FIG. 16. As a result, the flap 4 is turned in the release or counterclockwise direction in FIG. 16 around the attaching holes 4b in the end portions of the flap 4 and the rear edge of the flap 4 rises. By this movement, the rollers 7 held at the rear edge of the flap 4 move upward and the rollers 7 are released from the corresponding concavities 6.

In a state where the operating unit 10 is attached to the equipment body 20, the shielding plate 26 presses the connector 12 of the operating unit 10 forward by the resiliency of the spring 27. Therefore, when the operating unit 10 is released from the equipment body 20 by the locking mechanism 1, the operating unit 10 is turned by the pressing force of the shielding plate 26 so as to be fall forward or outward around the shaft portion of the supporting member 24. By the turning of the operating unit 10 forward or outward, the rollers 7 move on the tapering portions 23. In this way, as shown in 9, the operating unit 10 is removed from the equipment body 20.

By releasing the operating force applied to the release button 11 after the operating unit 10 is removed from the equipment body 20 in this way, the release plate 3 is moved leftward to return to its initial position by the action of the extension spring 5. At this time, the tilted portions 3b of the release plate 3 move leftward from the notches 4e on the flap 4 and the abutting edge 4h of the rear edges of the flap 4 are forced downward along the tilted edges of the tilted portions 3b. Therefore, the step 4 is turned in the locking or clockwise direction from the position of FIG. 16 and the locking mechanism 1 returns to its initial state of FIG. 15.

(3) Effect of the Typical Embodiment

As described above, in the present embodiment, by a simple operation in which the shaft portion of the support 24 of the equipment body 20 is fitted into the corresponding portion of the groove 13 in the operating unit 10, and the operating unit 10 is then turned, the operating unit 10 is easily and securely attached to the equipment body 20. In the locking mechanism 1 of the present embodiment which takes the initial state as mentioned above, the flap 4 which holds the rollers 7 as the second locking portion is restricted from above by the release plate 3, as mentioned above. Thus, the locked state of the rollers 7 and the corresponding concavities 6, and hence the locked state of the operating unit 10 and the equipment body 20 are maintained reliably in a stabilized manner.

As mentioned above, the shielding plate 26 of the connector 25 is biased invariably forward by the spring 27 attached to the back of the shielding plate 26. Therefore, even if the operating unit 10 is pressed against the equipment body 20 with a high force when the operating unit 10 is attached, possible impacts due to such press are alleviated by the spring 27. Therefore, there is no danger of a trouble such as damage to the equipment due to such impacts occurring.

In the present embodiment, when the operating unit 10 is removed, only a simple operation of moving the release button 11 in the release direction is required to forward or outward turn the operating unit 10 automatically by the resiliency of the spring 27 attached to the connector 25 of the equipment body 20, so that the operating unit 10 is removed from the equipment body 20 easily and securely.

In addition to the above effects, the rollers 7 which are the engaging means are provided at the respective ends of the operating unit 10 in the operating unit locking apparatus of the present embodiment, so that even if the operating unit 10 is increased in size, the operating unit 10 can be securely fixed to the equipment body 20. Therefore, the locking device has high reliability.

In the present embodiment, since the release plate 3 and the flap 4 which are the main elements of the present embodiment are assembled integrally as the locking mechanism 1, so that productivity is high advantageously. The plate holder 2, release plate 3 and flap 4 which constitute the locking mechanism 1 are each made of a thin plate-like member and superimposed vertically and assembled, so that the depth of the assembly is minimized as necessary. The minimization of the depth of the locking mechanism 1 contributes to the thinning of the overall operating unit 10 to thereby facilitate the transportation of the operating unit 10 to thereby improve a feeling of actual use of the user.

(4) Modification of the Typical Embodiment

As a modification of the embodiment, for example, the release plate 3 and flap 4 may be directly attached to the inner side of the operating unit 20 in place of being attached to the plate holder 2. In such structure, the number of parts is reduced and the operating unit 20 is miniaturized and simplified.

In place of the use of the operating unit 10 whose lower surface has a concave engaging portion (groove 13) and the instrument body 20 whose lower edge has a convex engaging portion (support member 24), the instrument body 20 may have a groove 28 on its lower portion while the operating unit 10 has a protrusion 14 on its lower surface such that they can be engaged with each other, as shown in FIG. 17.

In addition, arrangement may be such that, for example, as shown in FIG. 18, a locking mechanism 1 which is provided with rollers 7, release plate 3 and flap 4 is provided in the equipment body 20 while a first locking portion such as concavity 6 is provided in the operating unit 10. In such structure, a mechanism which includes a locking member of the locking means is not provided in the operating unit 10 which is carried by the user, so that the operating unit is further reduced in size and weight, and that when the operating unit is carried, there is no danger of the mechanism which includes the locking member being damaged.

The positions of the engaging means and the locking means can be selected freely. For example, conversely to the above embodiment, the engaging means may be disposed on a lower side while the locking means may be disposed on an upper side. As shown in FIG. 19, engaging means may be provided at one end of the apparatus while locking means may be provided at the other end of the apparatus. In FIG. 19A, a groove 13 is provided on the right-hand side 13 of the operating unit 10 and a support member 24 is provided in the equipment body 20 at a position corresponding to that of the groove 13. As seen in FIG. 19B, concavities 6 are provided on the left-hand side of the equipment body 20 while a locking mechanism 1 having rollers 7 is provided at a position corresponding to that of concavities 6 in the equipment body 10.

FIG. 20 shows a modification similar to that of FIG. 19 and is provided with a groove 28 in the right-hand end portion of the equipment body 20 while a protrusion 14 is provided in the operating unit 10 at a position corresponding to that of the groove 28. The operating unit 10 has concavities 6 its the left-hand end side and the equipment body 20 has a locking mechanism 1 having rollers 7 at a position corresponding to that of the concavities 6.

The release plate 8 and the flap 4 which constitute the mechanism of the locking means are not required to be disposed collectively in one of the operating unit and the equipment body. For example, arrangement-may be such that a release plate 8 is provided in the operating unit and a flap 4 is provided in the equipment body such that a combination of these members constitutes locking means. Of course, the respective specified shapes and sizes of the elements are a matter of choice.

(5) Structure of a Second Typical Embodiment (FIGS. 21–27)

A second typical embodiment of the present invention will be described next. As shown in FIG. 21, the equipment body 80 has a substantially rectangular front 30a with an aspect ratio of about 1:3. The front 30a has a concavities 31 in its left-hand portion and a connector 32 to the right of concavities 31. The connector 32 is provided with a shielding plate and a spring (both are not shown) similar to those of the connector of FIG. 8. The shielding plate is normally biased forward by the spring. The front 30a has in its right-hand end a locking mechanism 33, which is composed of a base 34, locking member 35, release member 36, shaft 37 and coil spring 38, as shown in FIG. 22.

As shown in FIG. 22, the base 34 of the locking mechanism 33 takes the form of a box, and is fixed by its front to the equipment body 30. The base 34 has therein a vertical shaft 37 to which the rear end of the locking member 35 are attached rotatably around the shaft 37. The locking member 35 has at its front end a substantially V-like cross sectional locking member 35a. Provided backward in the vicinity of the locking member 35a is a rightward protruding support member 35c which supports the release member 36. The support member 35c takes the form of a U having a pair of upper and lower arms. The locking member 35 has a substantially rectangular hole 35b behind and in the vicinity of the shaft 37 thereof.

Disposed around the shaft 37 thereof is a coil spring 38 having a pair of coil portions. The coil spring 38 further has a U-like engaging portion between the coil portions and two engaging ends outside the coil portions. As shown in FIG. 23, the coil spring 38 is disposed such that its U-like engaging portion extends rightward through the hole 35b to abut on the forward side edge of the hole 35b in the locking member 35 and that its engaging ends abuts on the rear side end of the base 34. By the coil spring 38 thus disposed, the locking portion 35a of the locking member 35 is biased leftward.

The release member 36 is supported by the supporting portion 35c of the locking member 35. The release member 36 is composed of a pressable button 36a and a holder 36b which holds the button 36a such that the button 36a is movable back and forth. A pair of upper and lower grooves 36c is provided in the rear portion of the holder 36b such that the respective arms of the supporting portion 35c of the locking member 35 are inserted into the grooves 36c to support the release member 36 to the locking member 35.

The operating unit 40 has substantially the same size as the front 30a of the equipment body 30. The operating unit 40 has on its front a plurality of operable buttons (not shown) required for operating a CD player as in the former embodiment. As shown in FIG. 24, a pair of flexible hooks 41 is provided on the left-hand end of the operating unit 40 at positions corresponding to those of the concavities 31 in the equipment body 30 such that the hooks 41 engage the convexities 31, in which case the operating unit 40 is slightly turnable relative to the equipment body 20 around the hooks 41. A connector 42 is provided on the back of the operating unit 40 at a position corresponding to that of the connector 32 on the front 30a of the equipment body 30 such that the connector 42 is connected electrically to the connector 32.

As shown in FIGS. 24 and 25, a rectangular groove-like locked portion 43 is provided on the right-hand end of the operating unit 40 at a position corresponding to that of the locking portion 35a of the locking member 35 of the locking mechanism 33 such that the locked portion 43 is locked by the locking portion 35a of the locking member 35.

As shown in FIGS. 26 and 27, where the operating unit 40 is attached to the equipment body, the operating unit 40 is attached on the front 30a of the equipment body 30 by the left-hand engaging means and right-hand locking means such that the connectors 32 and 42 are electrically connected to permit the operation of the equipment body 30.

(6) Operation of the Second Typical Embodiment (FIGS. 28-31)

The operation of the present embodiment having the above structure is as follows.

First, when the operating unit 40 is to be attached to the equipment body 30, the overall operating unit 40 is pressed backward against the equipment body 30 such that the operating unit 40 is superposed on the front 30a of the equipment body 30. As a result, the hooks 41 of the operating unit 40 are engaged in the corresponding concavities 31 in the equipment body 30 and the locking portion 35a of the locking member 35 of the equipment body 30 enters the locked portion 43 in the operating unit 40. In this case, since the locking member 35 is biased in a locking or leftward direction by the coil spring 38, the locking member 35 is at a locked position before the operating unit 40 is pressed. As the operating unit 40 is pressed, the locked portion 35a of the locking unit 40 is pressed along the V-like tilted surface of the locking portion 35a by the rear end 40a of the operating unit 40 behind its locked portion 43. As a result, the locking member 35 is turned rightward in FIG. 28 against the action of the coil spring 38 such that the locking portion 35a rides over the rear end 40a of the locked portion 43 of the operating unit 40. When under such situation the operating unit 40 is further pressed backward, the locking portion 35a of the locking member 35 of the equipment body 30 reaches the locked portion 43 of the operating unit 40 and is entered into the locked portion 43 by the action of the coil spring 38 to thereby lock the locked portion 43. As a result, the operating unit 40 is fixed to the equipment body 30.

Conversely, when the operating unit 40 is to be removed from the equipment body 30, the button 36a of the release member 36 is depressed, so that as shown in FIG. 28, the locking member 35 is turned and its locking portion 35a is disengaged from the locked portion 43. As a result, the operating unit 40 is pressed and turned forward by a forward bias in the connector 32 of the equipment body 30. At this time, since the convexities 31 in the equipment body 30 and the hooks 41 of the operating unit 40 are in an engaged state, the hooks 41 function as a stop to slightly suppress a quantity of turning of the operating unit 40, as shown in FIG. 29. When in such state a force which exceeds the engaging force provided by the hooks 41 is applied to the operating unit 40 to disengage same from the hooks 41, the hooks 41 are disengaged from the corresponding convexities 31; the connectors 32 and 42 are completely disengaged from each other, and the operating unit 40 is completely disengaged from the equipment body 30, as shown in FIG. 30.

(7) Effect of the Second Typical Embodiment

The effects of the present embodiment are as follows. By only a very simple operation of pressing the operating unit 40 against the equipment body 30, the operating unit 40 is easily and securely attached to the equipment body 30. In such an attached state, the fixed state of the locked portion 43 and the locking portion 35 of the operating unit 40 and the equipment body 30 is kept by the coil spring 38. This state is maintained securely. As a result, the engagement of the hooks 41 of the operating unit 40 and the concavities 31 in the equipment body 30 is reliably maintained, so that the fixed state of the operating unit 40 and the equipment body 30 is maintained in a stabilized manner.

The operating unit 40 can be disengaged from the equipment body 30 easily and securely by a simple operation in which the button 36a of the release member 36 is depressed to release the locking means when required. Further, since in the present embodiment the fixing force of the locking member 35 is given by the resiliency of the coil spring 38, no difficulties occur even when the operating unit 40 as it is is removed without the button 36a being depressed. In the present embodiment, when the operator erroneously tries to remove the operating unit 40 as it is without depressing the button 36a of the release member 36 because he wants to remove the operating unit 40 in haste, the operating force acting in the removing direction acts as the unlocking force which is transmitted from the locked portion 43 to the V-like locking portion 35a to turn the locking member 35 against the action of the coil spring 38. Therefore, even when the user tries to forcedly remove the operating unit 40 as Just described above, no excessive load is applied to the locked region of the operating unit 40 and the equipment body 30 and hence no damage is applied to the locked region.

Since in the present embodiment the number of elements which constitute the locking means is small and the structure is simple compared to the former embodiment, productivity is high and cost reduction is substantial.

(8) Modification of the Second typical Embodiment

For example, as shown in FIG. 31, the locking member 35 may be constituted as a leaf spring as modification of the former embodiment. In this case, the locking member 35 itself is deformed by depressing the button 36a of the release member 36 to thereby lock/unlock the locking portion 35a. In this case, the coil spring 38 is omitted to thereby further simplify the overall structure.

The convexity-concavity relationship of the locking means is selectable when required. For example, as shown in FIG. 31, the locking portion 35a provided in the locking member 35 may take the form of a V opposite in direction to that of the former embodiment to thereby provide a protruding shape of the locked portion 43. Similarly, the engaging means may include a concavity in the operating unit 40 and a protrusion on the equipment body 30 mating into the concavity.

(9) Other Embodiments

The present invention is not limited to the above-mentioned respective embodiments. For example, the present invention is generally applicable widely to vehicle-mounted electronic equipment such as cassette players and radio sets or complex devices which include a combination of some of them in addition to the CD players.

The respective specified structures of the engaging means and the locking means in the present invention may be modified when required, and especially the specified shapes of the engaging and locking means using convexities and concavities may be selected when required.

In addition, those skilled in the art can provide various changes and modifications on the basis of the spirit and features of the present invention and all those changes and modifications should fall within the scope of the present invention defined in the appended claims.

What is claimed is:

1. A locking structure for locking an operating unit on equipment to which said operating unit is to be attached, comprising:
    engaging means for engaging a first part of the equipment and a corresponding part of the operating unit;
    locking means, operable under an engaging state of said engaging means, for locking a second part of the equipment and a part of the operating unit corresponding thereto;
    lock controlling means for controlling said locking means so as to be shifted between a first position at which said locking means is in a locked state and a second position at which said locking means is released;
    a restricting member; and
    a rocking member, being movable toward a restricting position where said restricting member depresses a part of said rocking member to a second position, whereby said locking means is shifted to a released state, said restricting member includes a convex restricting portion which abuts on said rocking member to restrict the turning of said rocking member when said restricting member is at the restriction position, and said rocking member includes a notch for receiving said convex restricting portion such that said rocking member is released from the restriction by said convex restricting portion when said restricting member moves to said releasing position.

2. The structure according to claim 1, wherein said restricting means further comprises a biasing member for biasing said restricting member toward said restricting position.

3. The structure according to claim 1, wherein said restricting means further comprises a releasing member for driving said restricting member to said releasing position against the biasing force of said biasing member.

4. The structure according to claim 1, wherein said restricting portion of said restricting member comprises an elastically deformable flexible portion protruding toward said rocking member.

5. The structure according to claim 1, wherein said restricting member turns said rocking member to said releasing position when said restricting member moves to said releasing position.

6. The structure according to claim 1, wherein said restricting member comprises a press portion which, in turn, comprises a tilted portion, and said rocking member comprises a follower portion abutting on said press portion; and
    said press portion and said follower portion are such that the tilted portion of said press portion presses the follower portion when said restricting member is moved to said releasing position to thereby turn said rocking member to said releasing position.

7. The structure according to claim 1, wherein said operating unit has a pair of ends;
    said engaging means engages one of the ends of the operating unit and a portion of the equipment corresponding to said one end of the operating unit; and
    said locking means locks up the other of the ends of the pair of the operating unit and a portion of the equipment corresponding to the other of the ends of the pair of the operating unit.

8. The structure according to claim 7, wherein said operating unit has a main vertical surface and a back surface, said operating unit being attached at its back surface to a vertical surface of the equipment; and
    said pair of ends of the operating unit includes a pair of vertical sides of the operating unit.

9. The structure according to claim 7, wherein said operating unit has a main horizontal surface and a back surface, said operating unit being attached at its back surface to a vertical surface of the equipment; and
    said pair of ends of the operating unit includes a pair of horizontal sides of the operating unit.

10. The structure according to claim 1, wherein said restricting member includes:
    a biasing member for invariably biasing said rocking member toward said locking position.

11. The structure according to claim 10, further including a release member for driving said rocking member toward said releasing position against the biasing action of said biasing member.

12. The structure according to claim 1, wherein said engaging means is a center around which the operating unit is turnable in an engaged state within a predetermined range relative to the equipment.

13. The structure according to claim 1, wherein said engaging means comprises a pair of flexible hooks provided on said operating unit and a pair of convexities provided on said equipment engageable thereto, said locking means comprising lock portions provided on said operating unit and said equipment, and said lock controlling means comprises a pushbutton and a biasing member provided on said equipment.

14. The structure according to claim 13, wherein said biasing member comprises a coil spring.

15. The structure according to claim 1, wherein said engaging means comprises a pair of concavity members and corresponding convexity members, each of which is provided on one of said equipment and said operating unit.

16. The structure according to claim 15, wherein said concavity members comprise a groove portion provided on said operating unit and said convexity members comprise an arm portion provided on said equipment.

17. The structure according to claim 15, wherein said convexity members comprise a projecting portion uniformly provided on said operating unit and said concavity members comprise a groove portion provided on said equipment.

18. A locking structure for locking an operating unit on equipment to which said operating unit is to be attached, comprising:

engaging means for engaging a first part of the equipment and a corresponding part of the operating unit;

locking means, operable under an engaging state of said engaging means, for locking a second part of the equipment and a part of the operating unit corresponding thereto;

lock controlling means for controlling said locking means so as to be shifted between a first position at which said locking means is in a locked state and a second position at which said locking means is released; and connector means on said equipment including a connector for connection electrically to said operating unit, a shielding member for movably covering the connector, and a spring for normally biasing said shielding member to extend outward from said connector, said shielding member pressing said operating unit outward using the biasing force of said spring to thereby move said operating unit in that direction when said locking means is released.

19. The structure according to claim 18, wherein said lock controlling means comprises a rocking member arranged to be vertically rocked in accordance with a shift of said locking means and a restricting member for restricting movement of said locking means in a vertical direction.

20. The structure according to claim 18, wherein said locking means comprises a pair of roller members provided on said operating unit and a pair of concavities in which said roller members are to be inserted.

21. The structure according to claim 18, wherein said engaging means and said locking means are arranged in parallel in a horizontal direction.

* * * * *